J. H. Williams,
Harrow.
No. 94,855. Patented Sep. 14, 1869.
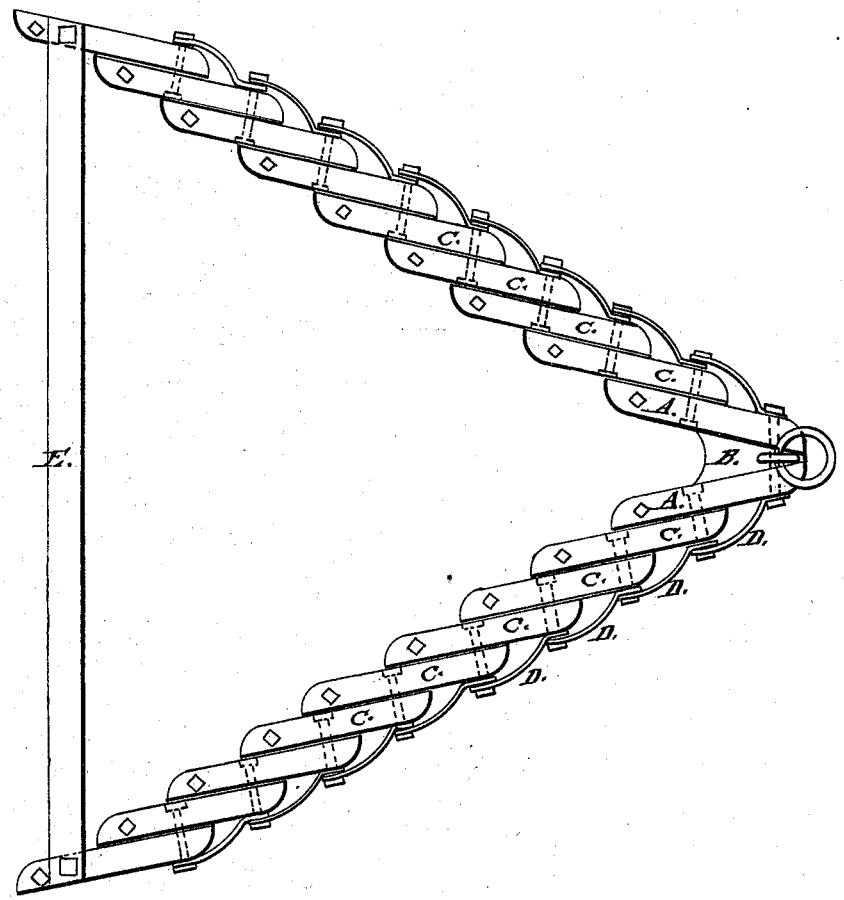
Witnesses:
Geo. W. Mabee
Jno. H. Brooks
Inventor:
J. H. Williams
By Munn & Co.
Attorneys

United States Patent Office.

JAMES H. WILLIAMS, OF TONTZVILLE, KANSAS.

Letters Patent No. 94,855, dated September 14, 1869.

IMPROVEMENT IN HARROWS.

The Schedule referred to in these Letters Patent and making part of the same.

*To all whom it may concern:*

Be it known that I, JAMES H. WILLIAMS, of Tontzville, in the county of Miami, and State of Kansas, have invented a new and useful Improvement in Harrows; and I do hereby declare that the following is a full, clear, and exact description thereof, which will enable others skilled in the art to make and use the same, reference being had to the accompanying drawings, forming part of this specification.

The object of this invention is to provide a harrow that will be adjustable to the surface of uneven ground, and admit any of the teeth to rise for jumping or passing over roots, stones, or other obstructions, and which will also be of simple and cheap construction.

It consists in the construction of the two branches of a triangular harrow, in short sections, lapping each other, and pivoted together so as to oscillate freely in vertical planes, and provided with strengthening-links connecting each pivot-bolt, all as hereinafter more fully specified.

The drawing represents a plan view of a harrow constructed according to my improvements.

To the legs A, of a short angular head-piece, B, and near the centre, at the outsides, I pivot at the front ends other short blocks or sections, C, so as to project about half their length behind the parts A, and to these I pivot other similar sections in the same way, adding as many as required for the length of the two branches of a triangular harrow, and I connect the pivot-bolts by links, D, at the outside of the sections, to sustain the drawing strains.

The rear ends of the branches are connected by a stay-bar, E.

Each section, C, is provided with one tooth near the rear end, but more may be used if preferred.

This arrangement permits the teeth encountering obstructions to be thrown up to a considerable extent without interfering with the others.

The spread of the branches will be due to the breadth of the sections and the distances between the pivot-bolts, and thus harrows of any required angle may be obtained.

Having thus described my invention,

What I claim as new, and desire to secure by Letters Patent, is—

The combination of the angular head-piece B, sections C, pivot-bolts, links D, and stay-bar E, when all arranged substantially as specified.

JAMES H. WILLIAMS.

Witnesses:
JAS. R. RICHARDS,
P. C. EATON.